United States Patent [19]

Czernik

[11] Patent Number: 5,340,525

[45] Date of Patent: Aug. 23, 1994

[54] METHOD OF FORMING A SEALING BEAD ON A GASKET

[75] Inventor: Daniel E. Czernik, Hinsdale, Ill.

[73] Assignee: Fel-Pro Incorporated, Skokie, Ill.

[21] Appl. No.: 942,310

[22] Filed: Sep. 9, 1992

[51] Int. Cl.$^5$ .................. B29C 43/18; B29C 43/20
[52] U.S. Cl. ..................... 264/266; 264/267; 264/268; 264/320
[58] Field of Search ............... 264/266, 267, 320, 268

[56] References Cited

U.S. PATENT DOCUMENTS

| | | | |
|---|---|---|---|
| 4,140,323 | 2/1979 | Jacobs | 277/166 |
| 4,625,979 | 12/1986 | Inciong | 277/180 |
| 4,659,410 | 4/1987 | McDowell | 156/277 |
| 4,830,698 | 5/1989 | DeCore | 156/219 |

FOREIGN PATENT DOCUMENTS 2000719 1/1979 United Kingdom ............... 264/266

*Primary Examiner*—Leo B. Tentoni
*Attorney, Agent, or Firm*—Laff, Whitesel, Conte & Saret

[57] ABSTRACT

A method of manufacturing a gasket having an improved elastomeric sealing bead. The method includes the steps of providing an embossment in a gasket body and filling the cavity of the embossment with an elastomer. The gasket is then positioned in a press and the embossment is squeezed to displace the elastomer into a sealing bead which projects from the flattened recess and beyond the major surface of the gasket body. The gasket is then removed from the press prior to use and installation in its intended environment.

6 Claims, 1 Drawing Sheet

ND,525

METHOD OF FORMING A SEALING BEAD ON A GASKET

TECHNICAL FIELD

This invention relates to a method of making a sealing gasket having an elastomeric sealing bead surrounding an opening in the gasket.

BACKGROUND OF THE INVENTION

Although mating surfaces of pairs of surfaces to be sealed, such as automotive engine component surfaces, appear to be smooth and flat, most frequently they are not sufficiently smooth to provide an effective seal. Accordingly, a gasket is required to be placed between such surfaces to provide an effective seal.

There are a wide variety of gasket designs, including metal gaskets, gaskets of fibrous materials, sandwich-type gaskets which combine a metallic core and compressible fiber-elastomer facing material laminated to the core, and so forth. As disclosed in U.S. Pat. No. 4,625,979, a wide variety of automotive gaskets are provided with sealing aids, such as elastomeric beads. Such beads are typically located on a face of the gasket by a variety of available processes. U.S. Pat. No. 4,659,410 describes a silk screening process for locating a sealing bead on a gasket surface.

As disclosed in U.S. Pat. No. 4,140,323, elastomeric beads can be deposited in embossments to confine the beads when the gasket is subjected to compression. The beads provide support for the embossment to avoid flattening of the embossment and thereby also enhance the effectiveness of the gasket in providing a seal.

Of course, for such beads to function most effectively, they must be accurately located within the embossments or accurately located on the surface of a gasket. In processes such as silk screening, therefore, it is necessary accurately to align the bead material as it is deposited and to assure a uniform deposit throughout the length of the bead. This is both laborious and expensive. Even though great care is exercised, it is still difficult to maintain accurate alignment between the sealing bead and the portion of the gasket on which the bead is deposited.

Therefore, it would be advantageous to provide an improved method for providing an elastomeric sealing bead for gaskets, especially for automotive gaskets.

SUMMARY OF THE INVENTION

In accordance with the present invention, an improved method for forming an elastomeric sealing bead for a gasket, such as an automotive gasket, is provided. The improved method comprises the steps of providing an expansive gasket body having a first major surface and a second major surface with an embossment, in which embossment defines a projection extending outwardly of a first major surface and further defines a concave recess having a first cross-sectional area opening outwardly of the second major surface of the gasket body with the concave recess being filled with a substantially incompressible elastomer, and thereafter squeezing the embossment to substantially reduce the first cross-sectional area of the concave recess, thereby to displace the elastomer to form a sealing bead projecting outwardly of the concave recess and beyond the second major surface. Preferably the gasket body defines a generally flat body portion in which the embossment is provided. Prior to the squeezing step, the concave recess way be only partially filled with the elastomer.

In one form of the practice of the method the step of squeezing comprises positioning the portion of the gasket body having the concave recess filled with elastomer between a pair of press plates and then squeezing the embossment. The method way be practiced by first forming the embossment, and thereafter filling the concave recess of the embossment or by concurrently forming an embossment and filling the concave recess with elastomer.

Other features and advantages of the present invention will become readily apparent from the following detailed description, the appended drawings and the accompanying claims.

DETAILED DESCRIPTION

Figure 1:
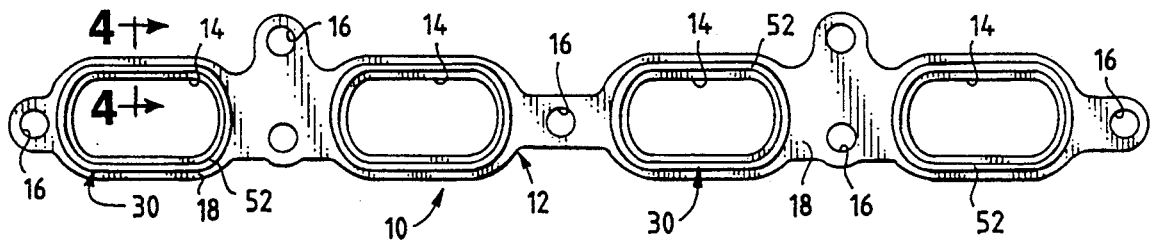
FIG. 1 is a plan view of a gasket made in accordance with the method of the present invention.

While the method of the present invention is susceptible of practice in various forms, there is shown in the drawings and will hereinafter be described, a preferred embodiment of the invention with the understanding that the present disclosure is to be considered as an exemplification of the invention and is not intended to limit the invention to the specific embodiment illustrated.

Figure 4:
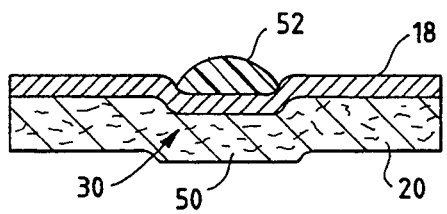
FIG. 4 is a cross-sectional view of the finished gasket of FIG. 1, taken substantially along line 4—4 thereof.

Referring now to the drawings, wherein like reference numerals indicate like parts throughout the several views, there is shown in FIGS. 1 and 4 a typical gasket 10. Gasket 10 is a manifold gasket and is adapted to be disposed, in a known manner, between a pair of automotive engine surfaces to be sealed. The details of the particular engine surfaces, which can be of various forms, form no part of the present invention, except that each gasket of the present invention will be configured as dictated by the particular pair of surfaces with which it is to be used, and will be proportioned to accommodate to the openings in the surfaces with which the gasket assembly is to be used and which the gasket is to seal.

Gasket 10 comprises a main gasket body 12 defining two spaced apart major or main surfaces. The main gasket body 12 further defines a plurality of suitably positioned apertures which may include service opening 14 and smaller openings 16 for bolts and the like.

Typically, the gasket body 12 may be a structure including two or more layers, such as two or more layers laminated in a conventional fashion to each other. In the embodiment illustrated in FIGS. 1 and 4, one layer of the gasket may be a steel sheet 18 defining one of the major or main surfaces. The other layer 20 may desirably be formed of a composite, heat-resistant, fiber-elastomer gasket facing material and may define the other major or main surface.

Layer 20 is laminated mechanically or adhesively to the steel sheet 18, as by a suitable heat-activated adhesive. Suitable heat-activatable adhesives include phenolic-nitrile rubber and polybutyral rubber which is desirably initially applied to the facing layer surface. Layer 20 may be an elastomer or may incorporate glass fibers, aramid fibers, cellulosic fibers, or other suitable fibrous material, which may be combined with rubber or a rubber-like material, such as a nitrile rubber, a neoprene rubber, or a polyacrylic elastomer as a binder.

Facing layer 20 desirably resists degradation by oils and coolants, retains torque, minimizes extrusion, and exhibits heat resistance. The steel sheet may be of cold rolled steel and its thickness may vary with the particular application. Total gasket thicknesses of from about 0.015 inch to about 0.060 inch are typical. In the embodiment illustrated, the thickness of the steel sheet is from about 0.005 inch to about 0.020 inch. To enhance adherence, the surface of sheet 18 to which layer 20 is joined may be phosphatized in a conventional manner, or may be otherwise surface treated to improve adhesion. Layer 20 may have a thickness of about 0.002 inch to about 0.025 inch. The overall thickness of an illustrative composite gasket 10 is about 0.020 inch to about 0.060 inch.

A desired sealing pattern is disposed on the main body portion of the gasket in selected zones. The sealing pattern comprises one or more flattened continuous embossments 30. As illustrated, each flattened embossment encircles a service opening 14. Flattened embossments are present in those zones in which increased or augmented sealing forces or supplemental seals are required or desired in the application for which the gasket 10 is to be used.

Figure 2:
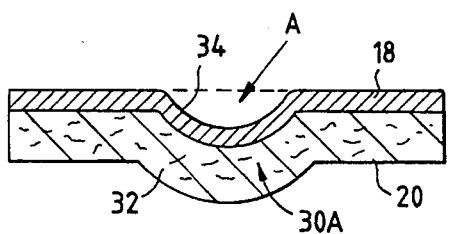
FIG. 2 is a cross-sectional view taken along a line like line 4—4 of FIG. 1 in a first stage of the manufacture of the gasket of FIG. 1.

As is best shown in FIG. 2, prior to flattening, each embossment 30A comprises a projecting portion or projection 32 extending outwardly of the flat main body portion from a generally flat portion of one major surface, and a corresponding indentation, concave recess or cavity 34 which extends inwardly from the other major surface. The cavity or recess 34 has a first cross-sectional area A. A filler material or sealing bead 36, which preferably comprises a resilient, substantially incompressible elastomeric material, is disposed in cavity 34 (see FIG. 3). The embossment cavity may be partially or fully filled.

One elastomeric material which is particularly suitable for use as a bead is a silicone elastomer, such as one sold by Dow Corning under the name SYLGARD 187. SYLGARD 187 is available as a two-component pourable system and may be generally described as being a condensation product of a linear, fluid organo polysiloxane containing terminal hydroxyl groups with an alkyl silicate ester. Usually a catalyst comprising a metal salt of a monocarboxylic acid is used to facilitate the curing of the system.

Figure 3:
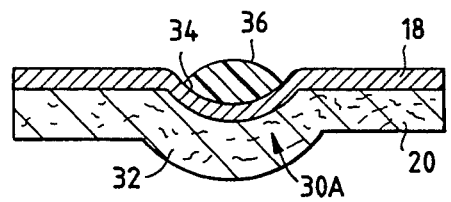
FIG. 3 is a cross-sectional view like that of FIG. 2 with a cavity suitably filled with an elastomer.
Figure 7:
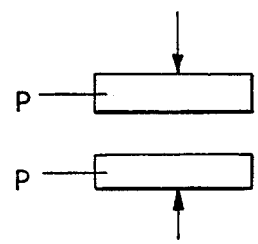
FIG. 7 illustrates a pair of press plates between which a gasket, such as that of FIG. 3, may be positioned to squeeze the gasket to produce a gasket as illustrated by FIG. 4.

After the embossment is filled to the desired extent, the gasket is disposed between a pair of press plates P (see FIG. 7) which are driven to squeeze and flatten the embossment, producing a flattened projection 50 and a projecting sealing bead 52 as illustrated by FIG. 4. As may be appreciated, when the embossment of FIG. 3 is flattened, the cross-sectional area A of the cavity is substantially reduced from the first cross-sectional area A illustrated in FIGS. 2 and 3 to the area illustrated by FIG. 4. At that point the manufacture of gasket 10 is complete and gasket 10 is ready for use between a pair of surfaces to be sealed and to produce a highly effective seal therebetween. The sealing bead 52 produces, under selected loading, a highly effective seal against one surface, while the other major surface of the gasket is caused to bear strongly against the opposite surface to be sealed. Indeed, the gasket produces a seal which is generally at least as effective as typical gaskets which are made by depositing an elastomeric bead on the surface of a generally flat gasket, and without the painstaking care which is required to assure that it is deposited accurately and consistently throughout its length.

It is also apparent that the nature of the seal can be varied by the shape of the embossment prior to flattening, the amount of the elastomer deposited in the cavity of the embossment, the degree of flattening and the configurations of the surfaces of the plates used during the reduction of the area of the cavity and the flattening of the embossment. Thus, for example, although the press plates may be flat, the lower press plate may be provided with an upwardly projecting bead to provide a narrow indentation in the lower surface to assist in providing a pair of spaced lower bead or projecting portions in the lower surface of the gasket to enhance the sealing effect of the projecting sealing bead. Thus the height and shape of the sealing bead may be varied, as compared with typical silk screening depositing methods where height variability is very limited.

The gasket 10, prior to squeezing or flattening may be made in a variety of ways. For example, it may be made by first forming an embossment in the gasket body and thereafter depositing a bead of elastomer in the cavity of the embossment. Alternatively, such a gasket prior to flattening may be made in accordance with the process described in U.S. Pat. No. 4,830,698. Thus a gasket blank (without an embossment) may be positioned between opposed and relatively movable die faces of a pair of dies, such that an embossment will be properly located on the gasket body. The major surface of the gasket from which the embossment 30 is to project is placed against the die having a recess. The die assembly is then actuated to hold the gasket body rigidly in place between the dies.

A relatively incompressible, fluid elastomeric seal material, such as the SYLGARD 187 material referred to above, is then applied through sprue openings under relatively high pressure against that major surface of the gasket opposite to the surface of the gasket overlying the recess in the die. The application of this high pressure elastomer seal material to one side of the gasket body has two simultaneous effects. First, the application of the sealant material under high pressure causes deformation of both of the major surfaces of the gasket body. That is, the application of the relatively high pressure, incompressible sealant material deforms a relatively small area of the flat major surfaces of the gasket such that the gasket body is bent and forced into the recess in the die to form an embossment. The embossment comprises then a projection corresponding to projection 32 which extends outwardly from one major surface of the flat portion of the gasket body to an extent defined by the recess in the die and a substantially corresponding cavity 34 extending inwardly from the other major surface of the gasket body. Besides deforming the surfaces of the gasket blank, some sealant material remains as a deposit or bead 36 which suitably fills the cavity 34 of the gasket body.

The cavity provided in the die opposite the recess defined by the other die is suitably designed to limit the level of filler material or bead deposited in the cavity formed in the gasket body, and to properly shape the bead material such that when it is cured, it will be of a desired configuration.

Figure 5:
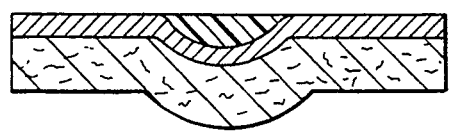
FIG. 5 is a cross-sectional view of a preformed gasket body prior to squeezing in accordance with this invention.

The thusly formed gasket, which might generally have a cross-section as illustrated by FIG. 5, is then ready to be squeezed and flattened to produce a gasket in accordance with the present invention. The embossment of FIG. 5 is comparable to that of FIG. 2.

Figure 6:
FIG. 6 is a cross-sectional view (similar to the view of FIG. 4) of another gasket formed in accordance with the method of the present invention.

Yet another possible cross-section of a gasket which may be made in accordance with the method of this invention is illustrated by FIG. 6. There, instead of a fiber-elastomer layer 20, the gasket body includes a metal layer with a microcoating of rubber on the side opposite the side from which the bead of elastomer projects. The cross-section of FIG. 6 is comparable to that of FIG. 4.

From the foregoing, it will be observed that numerous modifications and variations can be effected without departing from the spirit and scope of the present invention. It will be appreciated that the present disclosure is intended as an exemplification of the invention, and is not intended to limit the invention to the specific embodiments illustrated. The disclosure is intended to cover by the appended claims all such modifications as fall within the scope of the claims.

What is claimed is:

1. A method of manufacturing a gasket having an elastomeric sealing bead projecting outwardly from a major surface of a gasket body comprising the steps of:

providing an expansive, thin gasket body having a first major surface and a second major surface with an embossment, said embossment defining a projection extending outwardly of said first major surface and defining a concave recess having a first cross-sectional area opening outwardly of said second major surface of said gasket body, said concave recess being filled with a substantially incompressible elastomer;

positioning said gasket body in a press;

squeezing the embossment to substantially reduce said first cross-sectional area of the concave recess until the elastomer filled therein forms a sealing bead projecting outwardly of said concave recess and beyond said second major surface;

removing said gasket body from said press prior to use, and then providing said manufactured gasket for use.

2. The method of claim 1, and wherein said gasket body defines a generally flat body portion in which said embossment is provided.

3. The method of claim 1, and wherein said concave recess prior to said squeezing step is only partially filled with said elastomer.

4. The method of claim 1, and wherein the steps of positioning and squeezing includes positioning the portion of the gasket body having the concave recess filled with elastomer between a pair of press plates and then squeezing the embossment.

5. The method of claim 1, and wherein said step of providing said gasket body with an embossment comprises first forming said embossment, and thereafter filling the concave recess of the embossment.

6. The method of claim 1, and wherein said step of providing said gasket body with an embossment comprises the step of concurrently forming an embossment and filling the concave recess with elastomer.

* * * * *